United States Patent
Hogeman et al.

(10) Patent No.: US 12,166,277 B2
(45) Date of Patent: Dec. 10, 2024

(54) RADAR SYSTEM

(71) Applicant: THALES NEDERLAND B.V., Hengelo (NL)

(72) Inventors: Edwin Leonardus Josephus Hogeman, Hengelo Ov (NL); Eric André Kappel, Hengelo Ov (NL)

(73) Assignee: Thales Nederland B.V., Hengelo (NL)

( * ) Notice: Subject to any disclaimer, the term of this patent is extended or adjusted under 35 U.S.C. 154(b) by 114 days.

(21) Appl. No.: 17/798,407

(22) PCT Filed: Feb. 10, 2020

(86) PCT No.: PCT/EP2020/053360
§ 371 (c)(1),
(2) Date: Aug. 9, 2022

(87) PCT Pub. No.: WO2021/160248
PCT Pub. Date: Aug. 19, 2021

(65) Prior Publication Data
US 2023/0082027 A1    Mar. 16, 2023

(51) Int. Cl.
*H01Q 1/32* (2006.01)
*G01S 7/02* (2006.01)
*G01S 7/03* (2006.01)

(52) U.S. Cl.
CPC ............ *H01Q 1/32* (2013.01); *G01S 7/027* (2021.05)

(58) Field of Classification Search
CPC ... G01S 7/02; G01S 7/027; G01S 7/03; G01S 7/52; G01S 7/521; G01S 15/89; G01S 15/8922; G01S 15/8925; H01Q 1/32
See application file for complete search history.

(56) References Cited

U.S. PATENT DOCUMENTS

| | | | | |
|---|---|---|---|---|
| 5,327,152 A * | 7/1994 | Kruger | ............... | H01Q 21/0087 343/853 |
| 7,982,662 B2 * | 7/2011 | Shaffer | ................. | G01S 7/4813 250/203.1 |

(Continued)

FOREIGN PATENT DOCUMENTS

| CN | 110 058 224 A | 7/2019 |
|---|---|---|
| DE | 10 2018 113614 A1 | 12/2019 |

OTHER PUBLICATIONS

SAAB, "Giraffe 4A", 2015. https://www.radartutorial.eu/19.kartei/04.battle/pubs/giraffe_4a.pdf.

(Continued)

*Primary Examiner* — Tho G Phan
(74) *Attorney, Agent, or Firm* — BakerHostetler

(57) ABSTRACT

A radar system is provided based on a core module comprising a radar transducer based on a long, flat platform, provided with coupling elements at each end, which may comprise ISO standard compatible corner fittings as used in freight containers Accessory modules may be connected to the core module by means of these coupling elements at each end. Accessory modules may provide power, communications, cooling or other support functions as required. The coupling achieved between the core module and accessory modules may be reinforced with side brackets, and may be sufficiently strong that the weight of the complete assembly may be supported by the core module, or by the accessory modules. The combined length of the core module and accessory modules may be selected to correspond essentially to the length of a standard freight container, and the length of the core module alone may be selected to correspond to the flat bed of a standard medium truck.

20 Claims, 4 Drawing Sheets

(56) References Cited

U.S. PATENT DOCUMENTS

| | | | | |
|---|---|---|---|---|
| 9,335,412 B2* | 5/2016 | Proctor | ............... | G01S 15/8902 |
| 10,302,739 B2* | 5/2019 | Bleyer | ...................... | G01S 7/02 |
| 10,324,173 B2* | 6/2019 | Ryba | .................... | B06B 1/0688 |
| 10,338,195 B2* | 7/2019 | Stokes | ................. | G10K 11/006 |
| 11,367,425 B2* | 6/2022 | Antao | .................. | G10K 11/006 |
| 11,808,879 B1* | 11/2023 | Rocca | ................ | H05K 7/20272 |

OTHER PUBLICATIONS

"Weapons systems in ISO containers", Marine Engineers Review, 1982.

* cited by examiner

RADAR SYSTEM

CROSS-REFERENCE TO RELATED APPLICATION

This application is a National Stage of International patent application PCT/EP2020/053360, filed on Feb. 10, 2020, the disclosures of which is incorporated by reference in its entirety.

FIELD OF THE INVENTION

The present invention relates to the field of mobile radar systems, more in particular radar systems installed on ground based vehicles or trailers.

BACKGROUND PRIOR ART

Radar systems, in particular ground and seaborne systems generally are large, heavy, temperature, humidity and vibration sensitive, and typically have substantial power requirements. Meanwhile, in many contexts, it is desirable to render such systems mobile to some degree. There are known a number of attempts to achieve this in the prior art.

Certain solutions comprise dedicated vehicles, which may be modified heavy goods vehicles or other high power load carrying vehicles. Examples of such an approach include the Giraffe 4A radar. These vehicles are large, in particular being too large for drive-on Drive-off (DODO) air transport using a C130 transport plane or by train. Furthermore, the vehicles themselves are unable to meet the power and cooling requirements of typical mobile radar systems, and as such generally require an additional generator trailer to address these requirements, further limiting the mobility of the system as a whole.

Another prior art approach is that of the AN/TPQ-53. In this system the main radar transceiver is mounted on a trailer, which is towed by a truck containing ancillary equipment. This approach is once again of limited mobility.

Finally, radar systems in full size ISO standard containers are known. These may be transported using a dedicated extensible trailer.

In view of the forgoing, a solution permitting enhanced mobility of radar systems is required.

SUMMARY OF THE INVENTION

According to the present invention in a first aspect there is provided a radar system comprising a core module incorporating a radar transducer and ancillary components thereto, the core module having a major axis being two or more times as great as any other dimension of the core module. The core module further comprises an accessory coupling in the vicinity of each extremity of the major axis, wherein each accessory coupling comprises a structural mounting adapted to mate with a corresponding mounting on an accessory module.

In a development of the first aspect, the accessory coupling further comprises an electrical coupling to the radar transducer and/or the ancillary components.

In a further development of the first aspect, the core module comprises two longitudinal load bearing members parallel to the major axis and situated either side thereof, the radar transducer being mounted on the longitudinal members.

In a further development of the first aspect, the radar transducer is mounted with respect to the load bearing members by means of an articulated mounting permitting the free orientation of the radar transducer in at least one axis through an angle of at least 75 degrees.

In a further development of the first aspect, the radar transducer is mounted with respect to the load bearing members by means of an articulated mounting permitting the free orientation of the radar transducer between a non-operational position, and an operational position.

In a further development of the first aspect, the total height of the core module is maximally 150 cm when the radar transducer is in the non-operational position.

In a further development of the first aspect, the longitudinal members define a base, between 3.0 and 4.5 m long along the major axis.

In a further development of the first aspect, the core module further comprises a plurality of coupling points situated at the lower corners of the base, for connecting the base to ISO standard coupling points of a platform of a vehicle or trailer.

In a further development of the first aspect, the system further comprises an accessory module, comprising a structural mounting adapted to mate with the structural mounting of the core module such that the mechanical coupling thereby achieved is sufficient for the whole weight of the accessory module to be supported by the core module.

In a further development of the first aspect, the accessory module comprises an accessory base comprising coupling points situated at two or more of the lower corners of said accessory base, for connecting the accessory base to ISO standard coupling points of a platform.

In a further development of the first aspect, the accessory module contains a power generation unit adapted to provide electrical power to the radar transducer and/or said ancillary components via the electrical coupling.

In a further development of the first aspect, the accessory module contains a communications unit, wherein said communications unit is adapted to provide electrical communications between said radar transducer and/or said ancillary components and a remote entity.

In a further development of the first aspect, the radar system further comprises a first accessory module coupled at one extremity of the core module and a second accessory module coupled at the other extremity of the core module.

In a further development of the first aspect, the core module and the first accessory module and the second accessory module together have the floor dimensions of an ISO standard multimodal container.

In a further development of the first aspect, the radar transducer and/or one or more ancillary components are modular components optionally releasably coupled to (the base of) the said core module or to the (base of) the said accessory modules.

In a further development of the first aspect, the height of the base of the radar system is less than 50 cm.

In a further development of the first aspect, the core module and an accessory module are of substantially the same width, the radar system further comprising a first support bracket and a second support bracket, the first support bracket and second support bracket being positioned on either side of the core module with respect to the major axis, positioned at the junction between the core module and the accessory module, and engaging mounting points of the core module and the accessory module so as to maintain the core module and said accessory module in a fixed spatial relationship.

In accordance with the present invention in a second aspect, there is provided a land based vehicle or trailer comprising a radar system according to the first aspect.

In a further development of the second aspect, the combined height of the vehicle or trailer and the radar system is less than 2.59 m (102 inch).

In a further development of the second aspect, the combined height of the vehicle or trailer and the radar system allows for Drive-On, Drive-Off transport by airplane, train or ship.

BRIEF DESCRIPTION OF THE DRAWINGS

The invention will be better understood and its various features and advantages will emerge from the following description of a number of exemplary embodiments provided for illustration purposes only and its appended figures in which.

DETAILED DESCRIPTION OF THE INVENTION

Figure 1A:
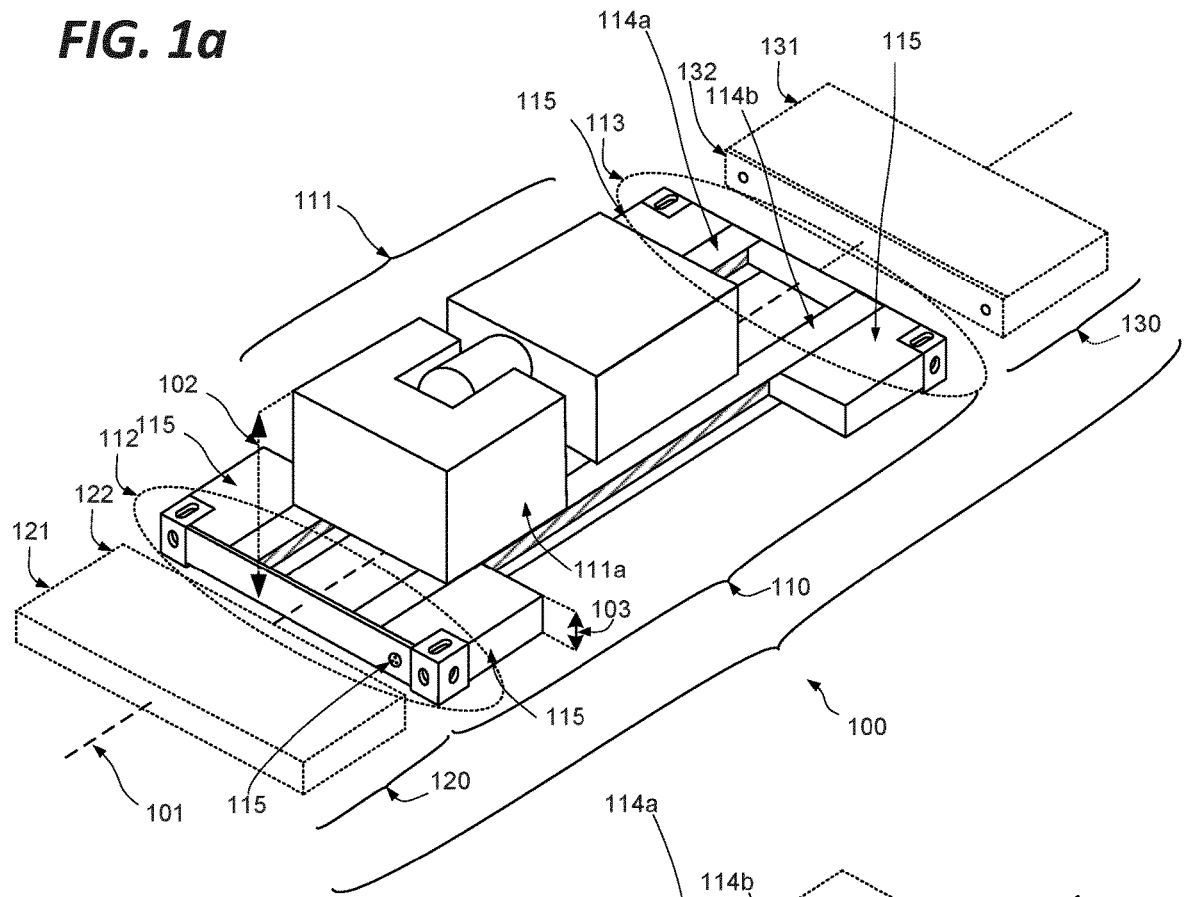
FIG. 1a shows a radar system in accordance with an embodiment.

FIG. 1a shows a radar system in accordance with an embodiment.

As shown, a radar system 100 comprises a core module 110 incorporating a radar transducer and ancillary components 111. The core module has a major axis 101, which is two or more times as great as any other dimension of said core module. The core module 110 further comprises a respective accessory coupling 112, 113 in the vicinity of each extremity of the major axis. Each accessory coupling 112, 113 comprises a structural mounting adapted to mate with a corresponding mounting on an accessory module 120, 130.

The accessory couplings 112, 113 as shown each comprise a pair of ISO 1161 compliant or compatible corner castings, as otherwise found on freight containers. These may be fully compliant with the ISO standard, or only partially compliant, for example by respecting the standard in terms of interface position and interface dimensions. Such a partial implementation may provide extra latitude for weight savings or performance improvements with respect to fully ISO compliant connections at the corners.

The accessory couplings may fulfil one or more roles. In particular, the accessory couplings comprise a structural mounting adapted to mate with a corresponding mounting on an accessory module as discussed below. Additionally, the accessory couplings may also optionally fulfil a function of coupling the core module to a supporting vehicle or platform.

Accordingly, in certain embodiments, the core module further comprises a plurality of coupling points situated at the lower corners the core module, in conformity with the ISO standard corner fitting specifications, which may be used for coupling the core module to an accessory module and/or to a platform, instead of or as well as other components of the coupling elements as described herein. The coupling points may be fully compliant with the ISO standard, or only partially compliant, for example by respecting the standard in terms of interface position and interface dimensions. Such a partial implementation may provide extra latitude for weight savings or performance improvements with respect to fully ISO compliant connections at the corners.

It will be appreciated that other mechanical couplings may be envisaged for coupling with the accessory modules, insofar as these couplings support a positive engagement with corresponding couplings in the accessory modules, so as to enable a releasable, but fixed engagement between the core module and the or each accessory module. Alternatively or in addition to the ISO 1161 compliant corner castings, each extremity of the core module may be provided with one or more tongues, pins, grooves, slots, sockets, hooks, cups or any combination of these, or any other such mechanical engagement device capable of achieving or improving the releasable, but fixed engagement between the core module and the or each accessory module, or any combination of these, when engaging corresponding features as provided on the corresponding accessory module. Further elements such as pins, bolts, belts, cables and the like may be provided additionally to complete the coupling as required. Such elements may thus constitute additional or alternative measures to realise or improve the connection to a platform or to realise or improve the connection between the core and the accessory modules An advantage of the ISO compatible connections for connecting the radar system to a vehicle or trailer is that these are standard ISO connections. Many vehicles or trailers are provided with such connections as a matter of course, and such elements can be fitted as a minor workshop intervention even where not provided by default, such that the core module and/or accessory module may easily be connected thereto.

Where such ISO connections are provided on a vehicle or trailer, they may optionally also be used to mate with a corresponding mounting on an accessory module. Additionally or alternatively, the accessory ISO connections may also optionally fulfil a function of coupling the combination of the core and one or two accessory modules to a supporting vehicle or platform. The coupling points on the accessory module may also be fully compliant with the ISO standard, or only partially compliant, for example by respecting the standard in terms of interface position and interface dimensions. Such a partial implementation may provide extra latitude for weight savings or performance improvements with respect to fully ISO compliant connections at the corners.

The core module and the at least one accessory module may thus be coupled to each other in a structural manner, meaning that the accessory module can be carried by the core module, and does not require to be supported by any other supporting means, such as a trailer, although depending on the length of the vehicle or trailer the accessory module may be supported by a vehicle or trailer. If however the length of the vehicle or trailer is limited to only supporting the core module, the core module may carry the at least one accessory module, for example at the rear end thereof as seen in a forward driving direction of the vehicle.

Preferably, the mechanical coupling is defined so as to be sufficiently solid so as to support the whole weight of any accessory module that may be connected to core module without additional support, when subjected to the acceleration forces that may be expected during transport of the radar system. The UN Economic Commission for Europe publishes typical acceleration levels for road, rail and sea transport at https://wiki.unece.org/display/TransportSustainableCTUCode/Chapter+5.%09 General+transport+conditions, which do not exceed 1 g. A one metric ton (1000 Kg) accessory module may generate acceleration forces on this basis of up to 10,000N. Each coupling should therefore be dimensioned and specified to support forces of this magnitude. More preferably, each coupling should be dimensioned and specified to support forces greater than those implied by the UNECE guidelines by a suitable safety factor. For example, each coupling should be dimensioned and specified to support forces twice those implied by the UNECE guidelines. Additional to these civil UNECE guidelines also military requirements could be applicable on the design of the coupling elements. Embodiments may comply for example with military requirements on road transportation described in AECTP-240, Leaflet 242/1.

Accessory modules 120, 130 may each comprise an accessory base 121, 131. These accessory bases may comprise coupling elements adapted to mate with the coupling elements of the core module as discussed above. In particular, the coupling elements may also comprise ISO standard compliant or compatible coupling points in partial or complete conformity with the ISO standard corner fitting specifications as discussed above, for connecting the accessory base to ISO standard coupling points of a platform. Alternatively to or in addition to the ISO 1161 compliant corner castings, each extremity of the accessory module may be provided with one or more tongues, pins, grooves, slots, sockets, hooks, cups or the like, or any combination of these, or any other such mechanical engagement device capable of achieving or improving the releasable, but fixed engagement between the core module and corresponding features of the or each accessory module, or any combination of these, when engaging corresponding features as provided on the core module, and/or between the core module or an accessory module and a supporting platform. Such elements may thus constitute additional or alternative measures to realise or improve the connection to a platform or to realise or improve the connection between the core and the accessory modules.

In particular the at least one accessory module can be coupled to the core module. The accessory module may in particular be coupled to the core module in such a manner that the accessory bases thereof extend in substantially the same plane, and such that the accessory module extends in a longitudinal direction (i.e. along the axis 101) of the core module, i.e. is aligned with the core module, such that the total length of the radar system is increased by the addition of the additional element. The core module and the or each accessory module may have a substantially equal width (as shown), such that the width of the radar system is not increased by adding the accessory module.

Each accessory module, in particular the base thereof, may comprise universal (ISO) compatible connections as described above, for connecting the accessory base to (standard provided) universal (ISO) connections of a vehicle or trailer.

The accessory base of the accessory module may comprise a relatively stiff and/or rigid frame. The frame may be hollow, thereby providing space for accommodating for example electronics.

Corner mountings for freight containers are defined in ISO 668, which also defines allowable dimensions for freight containers as set out below:

TABLE 1

| ISO designation | External dimensions | | |
| --- | --- | --- | --- |
| | Length | Height | Width |
| 1EEE | 13.716 m/45' 0" | 2.896 m/9' 6" | 2.438 m/8' 0" |
| 1EE | | 2.591 m/8' 6" | |
| 1AAA | 12.192 m/40' 0" | 2.896 m/9' 6" | |
| 1AA | | 2.591 m/8' 6" | |
| 1A | | 2.438 m/8' 0" | |
| 1BBB | 9.125 m/29' 11.25" | 2.896 m/9' 6" | |
| 1BB | | 2.591 m/8' 6" | 2.438 m/8' 0" |
| 1B | | 2.438 m/8' 0" | |
| 1CC | 6.058 m/19' 10.5" | 2.591 m/8' 6" | |
| 1C | | 2.438 m/8' 0" | |
| 1D | 2.991 m/9' 9.75" | 2.438 m/8' 0" | |
| 1E | 1.968 m/6' 5.5" | 2.438 m/8' 0" | 2.438 m/8' 0" |
| 1F | 1.460 m/4' 9.5" | 2.438 m/8' 0" | |

As such, conventional standard compliant containers are roughly square in cross section.

As shown, in FIG. 1a the core module 110 comprises two longitudinal load bearing members 114a and 114b parallel to the major axis and situated either side thereof. The radar transducer 111 is mounted on these longitudinal members. It will be appreciated that other structures may be envisaged however this structure is both simple and exceedingly strong.

The longitudinal members 114a, 114b may be considered to define a base. In certain embodiments, the length of the base as represented by the dimension line 116 may be between 3.0 and 4.5 m, and more preferably between 3.8 and 4.2 M, even more preferably about 4.0 m.

As will be noted with respect to table 1 above, this range of lengths does not correspond to any of the lengths of standard freight containers, but is selected instead of corresponding to a common length of non-articulated trucks and medium weight transport vehicles. In particular, radar systems in accordance with embodiments may be transported conveniently by the so-called Boxer Multi-Role Armoured Vehicle, M113 (PMMC G5) or the ATF (Allschutz-Transport-Fahrzeug) Dingo. On this basis, a radar system in accordance with such embodiments may be conveniently transported by any such vehicle, rather than the specially adapted vehicles as described with respect to the prior art.

The core module may comprise additional parts of the mobile radar system, such as the antenna, processor, cooling unit, drive control unit, electronics, etc. Any or all of these may be provided as modular units, which may be mounted on the core module using any suitable mounting means, such as screws, bolts, or the like. Practically the core element comprises standard modular units, but optionally the modular units may be customer specific.

The longitudinal elements 114a, 114b, and other components of the base of the core module may be hollow so as to define a frame, thereby providing space for accommodating for example electronics. The space between the base frames is not partitioned and also optimally available for electronics, storage (of for instance) fuel, etc. By using all space available, the total size of the mobile radar can be limited.

The longitudinal elements 114a, 114b, and other components of the base of the core module may provide sufficient electromagnetic shielding that electronics and cables inside are protected against electromagnetic interference from the environment and from the radar transducer.

The base of the core module and/or the accessory module may have a limited height. More in particularly, the height of the base of the core module and/or the accessory module as represented by dimension line 103 may be much smaller than a total height of the core module 110 comprising the radar transducer and ancillary modules as represented by dimension line 102. For example, the height of the base module may be about 10-25% of the total height of the core module. More particularly, the height may for example be maximally 50 cm, and preferably approximately 25 cm.

By providing a mobile radar system having said core module and optionally one or two accessory modules that can be coupled thereto, the length of the radar system can be adjusted to a number of standard lengths of the vehicle or trailer. By providing a radar system having only said core, the length is adjusted to relatively short vehicles, such as the Boxer MRAV or the ATF Dingo vehicle. By providing one or two accessory modules, which can be connected to one or both longitudinal ends of the core module, the length of the mobile radar can be increased to fit for example a standard 1C military/industrial track or trailer. Such vehicles may then themselves be conveniently transported by railway, transport plane (e.g. the C130 plane as discussed above), and so on. By the same approach the system can be adapted to other modes of transport such as rail transport. As such, adaption of the mobile radar system to different standard used vehicles or trailers having a number of different, standard lengths is possible, without the requirement to adapt the vehicle.

Another advantage may be that no trailer is required, because if a power generator unit is provided as one of the accessory modules, that accessory module can be (structurally) coupled to the core module, without requiring further support of that accessory module.

Another advantage may be that the core module may be a standard element, wherein customer specific elements can be provided via an accessory module. This allows for easy reconfiguration of the system.

An advantage of providing said base module that are relatively thin as represented by dimension 103 in FIG. 1a, is that the height of the mobile radar system can be limited. This provides the advantage of being able to load the mobile radar system in a transportation air plane including the vehicle or trailer itself, thus not requiring the mobile radar to be removed from the vehicle or trailer during transport (DODO transport). Also, this may limit the height of the mobile radar system to the maximum height of the vehicle or trailer, such that the total height is not increased by the radar system.

Because the radar system is suitable for DODO transport the system may be quickly deployable, in particular after C130 air/train transport, and/or may quickly ready for C130 air/train transport.

The "thin" (as represented by dimension 103 in FIG. 1a) base module further provide a relatively large, unobstructed volume above the base module for radar installation and/or other elements.

The "thin" (as represented by dimension 103 in FIG. 1a) base module further provides the advantage of a relatively low centre of gravity, providing a relatively good off road terrain capability.

Meanwhile, the total height of the core module, in particular of the base and modular units mounted thereon as represented by dimension line 103, is preferably maximally 150 cm when the steerable antenna is in a retracted state (as will be described below, the antenna can be oriented between a retracted, transport/storage (non-operational) state in which the antenna is not in use, and a raised, operational state in which the antenna can be used).

Similarly, where the radar system is mounted on a vehicle, trailer or other platform, the combined height of the vehicle or trailer and the radar system may be preferably less than the available height in the cargo bay of a C130 transporter plane, or 2.59 m (102 inch).

On both longitudinal ends of the core module, in particular of the base thereof, said core module may comprise universal (ISO) connections, for connecting said core module to (standard provided) universal (ISO) connections of said vehicle or trailer. The distance between the universal (ISO) couplings on both ends of the core module may be chosen in accordance with the distance between the connections of the vehicle or trailer, which is a standard pitch distance of about 4 m for compact vehicles.

The base of the core module may in particular comprise a relatively stiff and/or rigid frame. Said frame may be hollow, thereby providing space for accommodating for example electronics.

The base of the core module as described above may comprise two longitudinal beams 114a, 114b on which the steerable antenna may be mounted, and the connections of the frame are provided on corner pieces thereof. In order to transfer the forces from the longitudinal beams to the coupling elements and then to the vehicle or trailer, torque and bend elements 115 may be provided arranged to transfer torque and bend loads. The torque and bend elements 115 may be designed in any suitable way.

The radar system may further comprise an electrical stabilization system. Such a system may for example comprise an angle measuring means for measuring a current angle of the mobile radar system, wherein a control means of the mobile radar system is arranged to correct for a current angle as measured by the angle measuring means. Such an electronic stabilization system is for example known from naval radar systems and now newly employed in this ground based system.

Additionally or alternatively, the transducer may comprise a phased array antenna with electronic beam steering. A phased array antenna with electronic beam steering enables orientation and stabilization of the transducer without the need for mechanical movement of the transducer, or with reduced need for mechanical movement of the transducer.

As described above, an accessory module may be coupled to the core module at either end, or at both ends. Advantageously, the length of one or more accessory modules may be determined such that the combined length of the core module and a first and/or a second accessory module is substantially equal to the length of an ISO standard multimodal container e.g. as set out in table 1 above. In particular, the combined length of the core module and a first and/or a second accessory module may be substantially equal to the length of a class 1C or class 1CC ISO standard multimodal container as set out in table 1 above. By this means, the complete system including one or two accessory modules may conveniently be transported by commonly available means for transporting standard freight containers, e.g. by road, rail or ship.

A pitch distance between the outer connections of two accessory modules, when coupled to the longitudinal ends of the core module, may be about 20 ft (see table 1 above), which corresponds to the pitch distance of the connections of a standard vehicle or trailer.

In accordance with certain embodiments, the radar transducer 111 may be mounted with respect to the load bearing members114a, 114b by means of an articulated mounting 111a permitting the free orientation of said radar transducer between a first non-operational position, and an operation position. FIG 1a shows the radar transducer 111 as mounted with respect to the load bearing members 114a, 114b by means of an articulated mounting 111a permitting the free orientation of said radar transducer, with the radar transducer in a first, non-operational position. Specifically, the radar transducer is shown in a substantially horizontal position, parallel to the plane of the load bearing members.

Accordingly, the transceiver (antenna) may be articulated between a non-operational state (retracted, transport/storage) in which the antenna is not in use, and a raised, operational state in which the antenna can be used. In the retracted, transport/storage state the antenna is provided within the maximum height dimension of the mobile radar system as described above. In the raised, operational state the antenna may be hinged out of this maximum height. The forces of the articulated transducer, i.e. during hinging between the retracted state and the raised state, may act on the frame of the base of the core module. By providing said stiff and/or rigid frame, the frame is able to withstand these forces and/or to transfer these forces to the vehicle or trailer on which it is mounted. The torque and/or bend elements 115 also provide this advantage for torque and/or bend forces.

This articulation may also be dynamically controlled so as to implement an electronic stabilization system, making the radar system quickly deployable, because it does not need mechanical levelling as in prior art radar systems do. The vehicle or trailer may simply stop on any, optionally non-flat and/or inclined surface, because the electronic stabilization system will correct for this surface.

Figure 1B:
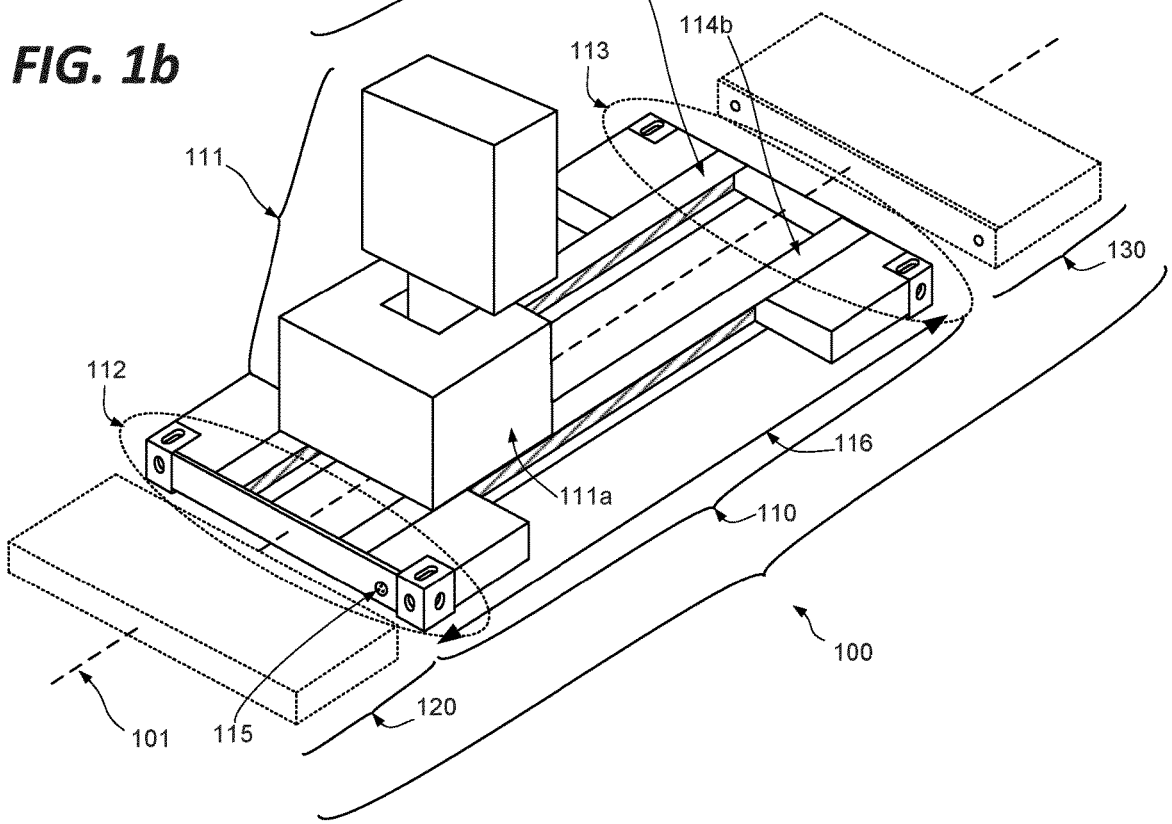
FIG. 1b shows a radar system in accordance with an embodiment.

FIG. 1b shows a radar system in accordance with an embodiment.

FIG. 1b shows the radar system of FIG. 1a, with the radar transducer in a second, operational position. Specifically, the radar transducer is shown in a substantially vertical position, substantially at right angles to the plane of the load bearing members. It will be appreciated that the notion of an operational position and a non-operational position will depend on the general configuration of the radar system, and need not correspond to horizontal and vertical arrangements respectively, Even where such general configurations apply to a particular system, it may not be necessary, or indeed desirable, for the transducer to be exactly horizontal in a non-operational position, or exactly vertical in an operational position. In certain embodiments the transducer may be situated at an angle of between 0 and 30 degrees to the plane of the load bearing members in the operational configuration. More preferably, in certain embodiments the transducer may be situated at an angle of between 0 and 15 degrees to the plane of the load bearing members in the non-operational configuration. In certain embodiments the transducer may be situated at an angle of between 90 and 70 degrees to the plane of the load bearing members in the operational configuration. More preferably, in certain embodiments the transducer may be situated at an angle of between 90 and 80 degrees to the plane of the load bearing members.

As shown, the radar transducer 111 is mounted with respect to the load bearing members 114a, 114b by means of an articulated mounting 111a permitting the free orientation of the radar transducer in at least one axis through an angle of at least 75 degrees.

It will be appreciated that the provision of a highly articulated mounting permitting the translation of the transducer through a wide angle as described above is that beyond merely permitting operational alignment of the transducer, it makes it possible for dimensions of the system as a whole to be reduced in a non-operational configuration, in line with the general objectives of the present invention.

On this basis, in certain embodiments the total height of the core module may not exceed 150 cm when said radar transducer is in said first non-operational position.

It will be appreciated that the articulated mounting 111a may additionally or alternative permit the orientation of the transducer in other axes, for example about a vertical axis.

In accordance with certain embodiments, one or each accessory coupling may further comprise an electrical coupling to the radar transducer and/or the ancillary components. As shown in FIGS. 1 and 2 this is represented schematically by electrical coupling 115. It will be appreciated that in practice the coupling may take many forms. The electrical coupling may comprise a plurality of separate connectors. Some or all of the connector may not be in a fixed configuration with respect to the core module, but may be implemented by means of flexible connectors.

As described above, the couplings 112, 113 of the core module couple with accessory modules 120, 130. In certain embodiments, either or both of these accessory modules may comprise a power generation unit. Such a power generation unit may be adapted to provide electrical power to the radar transducer and/or the ancillary components 111. Electrical power may be provided via the electrical coupling or couplings as discussed above. The power requirements of a radar system according to the present invention may typically be in the order of 50 kW (under all conditions, high temperature, high altitude). The dimensions of such a generator may be in the order of w*d*h=2.4 m*1 m*1.25 m (including load-frame), and weigh 1.2 metric tons.

In certain embodiments, either or both of these accessory modules may comprise a communications unit, adapted to provide electrical communications between the radar transducer and/or said ancillary components and a remote entity. Electrical communications may be achieved between the radar transducer and/or its ancillary systems and the communications unit (an thence to the remote entity) via the electrical coupling or couplings as discussed above.

Any other supporting system of the radar system may be incorporated in an accessory module as well as or instead of any of the aforementioned accessory systems. Each accessory module may comprise a plurality of such systems. Two accessory modules providing redundant functionality may be provided.

By providing modular components (a core module including most essential parts of the radar system and optionally one or more accessory modules including for example a power generator unit and/or customer specific features) having accessory couplings as described above, the mobile radar system can be mounted on different vehicles, in particular having a number of different, standard lengths, without the need to adapt the vehicle, and having a relatively low height that fits within a limited height for DODO C130 air/train transport including the vehicle on which the radar system is mounted.

Figure 2A:
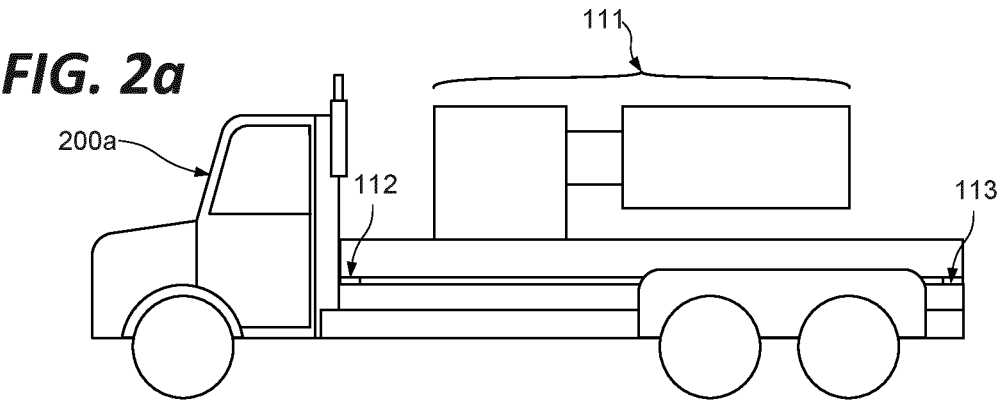
FIG. 2a shows a radar system mounted on a vehicle in an embodiment.

FIG. 2a shows a radar system mounted on a vehicle in an embodiment.

As shown in FIG. 2a, a core module 110 as shown in FIGS. 1a and 1b above is mounted on the flat bed of a medium truck 200a. As described above, the typical flatbed length of such vehicles is between 3.0 and 4.5 m, and as shown the core module fits within the available length. As shown, the coupling elements 112, 113 engage the load bearing surface of the truck, and may be conveniently fixed to the truck by means of securing pins, tension straps, or other conventional methods as known in the art.

Figure 2B:
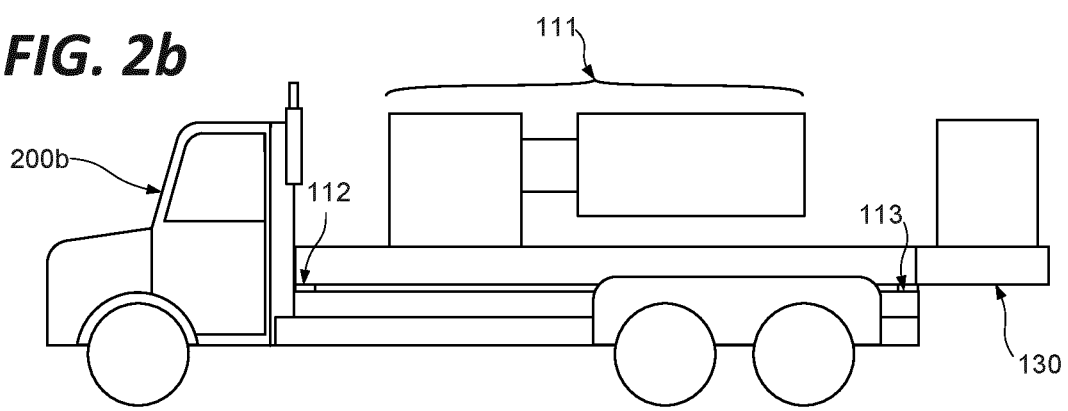
FIG. 2b shows a radar system mounted on a vehicle in an embodiment.

FIG. 2b shows a radar system mounted on a vehicle in an embodiment.

As shown in FIG. 2b, a core module 110 as shown in FIGS. 1a and 1b above is mounted on the flat bed of a medium truck 200b, corresponding substantially to that shown in FIG. 2a. In FIG. 2b meanwhile, an accessory module 130 as described above is coupled to coupling 113. The accessory module may comprise a power supply module, cooling module, or other accessory module as described herein. As shown, the accessory module 130 extends beyond the end of the flat bed of the truck 200b, and is supported solely by the coupling 113. By this means, the core module supports the extension of the load bearing volume of the truck 200b.

Figure 2C:
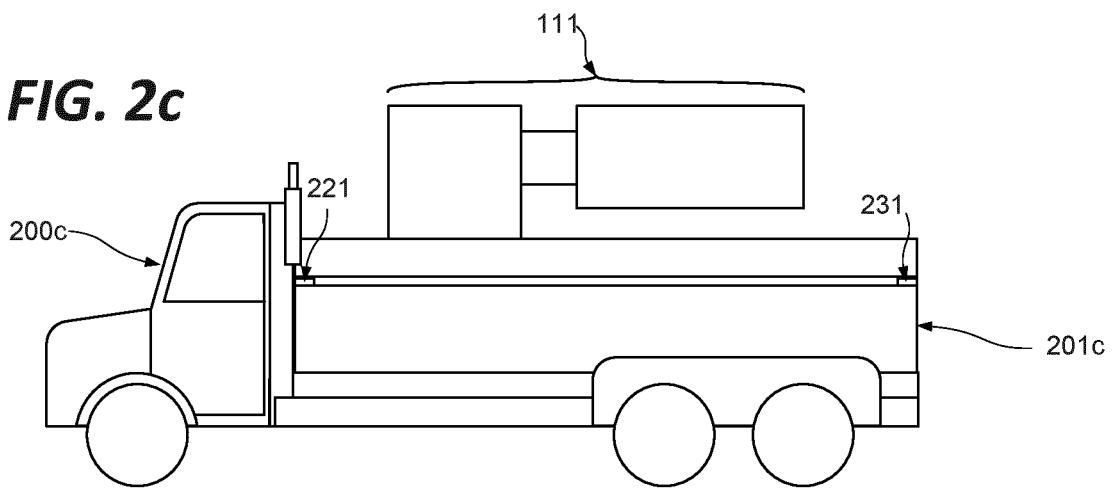
FIG. 2c shows a radar system mounted on a vehicle in an embodiment.

FIG. 2c shows a radar system mounted on a vehicle in an embodiment.

As shown in FIG. 2c, a core module 110 as shown in FIGS. 1a and 1b above is transported by a medium truck 200c, corresponding substantially to that shown in FIGS. 2a and 2b. In FIG. 2c meanwhile, rather than being mounted directly on the flat bed of the truck 200c, an intermediate unit 201c is provided mounted on the flatbed of the truck 200c, and the core module 110 is mounted on the intermediate unit 201c. As shown, the coupling elements 112, 113 engage the upper surface of the intermediate unit 201c, and may be conveniently fixed to the truck by means of securing pins, tension straps, or other conventional methods as known in the art.

The intermediate unit 201c may comprise additional components of the radar system, or some other component of the truck's payload. Alternatively the intermediate unit may be an empty space which may be loaded with other payload as required. Still further, the intermediate unit may simply comprise an intermediate structure provided to better adapt the truck to support the core module 110, for example by providing dedicated coupling points adapted to engage the coupling elements 112, 113.

The intermediate unit may be of any construction and dimensions, in accordance with its function as discussed above.

Figure 2D:
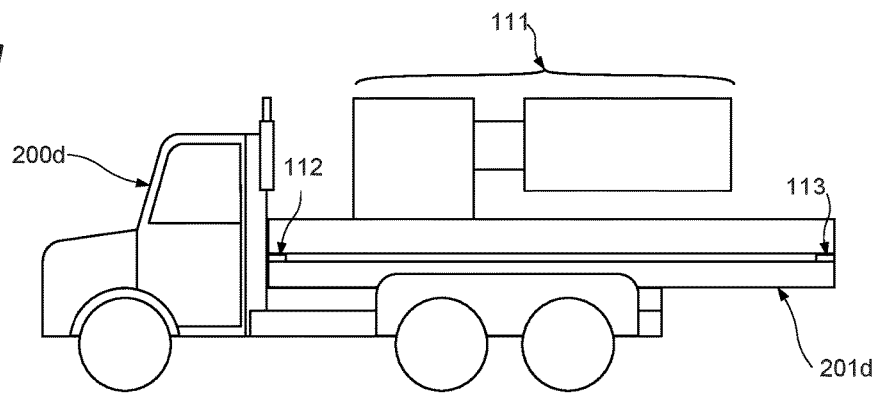
FIG. 2d shows a radar system mounted on a vehicle in an embodiment.

FIG. 2d shows a radar system mounted on a vehicle in an embodiment.

As shown in FIG. 2d, a core module 110 as shown in FIGS. 1a and 1b above is transported by a medium truck 200d, corresponding substantially to that shown in FIG. 2c. In FIG. 2d meanwhile, rather than being mounted directly on the flat bed of the truck 200d, an intermediate unit 201d is provided mounted on the flatbed of the truck 200d, and the core module 110 is mounted on the intermediate unit 201d. As shown, the coupling elements 112, 113 engage the upper surface of the intermediate unit 201cd, and may be conveniently fixed to the truck by means of securing pins, tension straps, or other conventional methods as known in the art.

As shown, the intermediate unit 201d extends beyond the end of the flat bed of the truck 200d. As such, the intermediate unit may be provided to adapt a small truck so as to support the two ends of the core module as described above at the coupling elements 112, 113.

Accordingly, an intermediate unit may connect to any other type of vehicle having a different length than the lengths generally defined by adding a core module and one or more accessory modules, or a platform having no ISO connections, wherein the intermediate unit is mounted (directly or indirectly) to the vehicle or trailer, optionally in a different way not using ISO connections, and wherein the radar system is mounted on the intermediate unit in the manner as described above. The intermediate unit may have ISO connections on its upper side for connecting to the core and one or two additional element(s), and optionally also on its lower side for connecting (directly or indirectly) to the vehicle or trailer. The ISO connections on the upper side have a pitch distance in accordance with any of the three lengths. The optionally provided ISO connections on the lower side have a pitch distance in accordance with a pitch distance of ISO connections of said vehicle or element mounted on said vehicle on which said intermediate unit is mounted.

The intermediate unit may be of any construction and dimensions, in accordance with its function as discussed above.

The intermediate unit provides the advantage that the mobile radar system may also be mounted on other vehicles or trailers not having any of the three lengths for which the mobile radar system is designed or a vehicle or trailer not having ISO connections. This provides the advantage that also for other type of vehicle or trailer, no adaptions of the vehicle and/or mobile radar system are required, but only the provision of a specially designed intermediate unit.

As described above, the length of one or more accessory modules may be determined such that the combined length of the core module and a first and/or a second accessory module is substantially equal to the length of an ISO standard multimodal container e.g. as set out in table 1 above. In particular, the combined length of the core module and a first and/or a second accessory module may be substantially equal to the length of a class 1C or class 1CC ISO standard multimodal container as set out in table 1 above. By this means, the complete system including one or two accessory modules may conveniently be transported by commonly available means for transporting standard freight containers, e.g. by road, rail or ship.

Figure 2E:
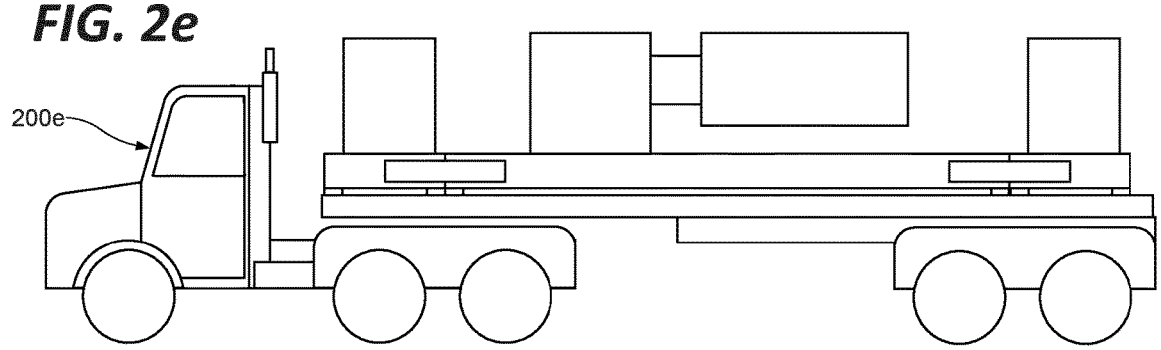
FIG. 2e shows a radar system mounted on a vehicle in an embodiment.

FIG. 2e shows a radar system mounted on a vehicle in an embodiment.

As shown in FIG. 2e, a core module 110 coupled to a first accessory module 120 and a second accessory module as described above is transported by an articulated truck 200e. Accordingly, FIG. 2e may show the transport of a complete system including two accessory modules by an articulated truck configure to transport standard freight containers.

In any of the embodiments of FIGS. 2a, 2b, 2c, 2d, 2e or otherwise, the vehicle or trailer may comprise coupling elements that can cooperate with the coupling elements of the core module, or of the one or two accessory modules.

In certain embodiments, coupling elements of the accessory module(s) and/or of the core module are used to secure the system with respect to a platform, on a vehicle as described above or otherwise. Depending on the configuration coupling elements can comprise fittings at the corners of the core module and/or of the accessory module(s) or further additional elements. Generally corresponding support fittings may be at the outer corners of the supporting part of the platform. Depending on the size of the platform the coupling elements of the core and/or additional elements can be used. In this selection the used coupling elements are as eccentric as is possible in the used configuration.

Figure 2F:
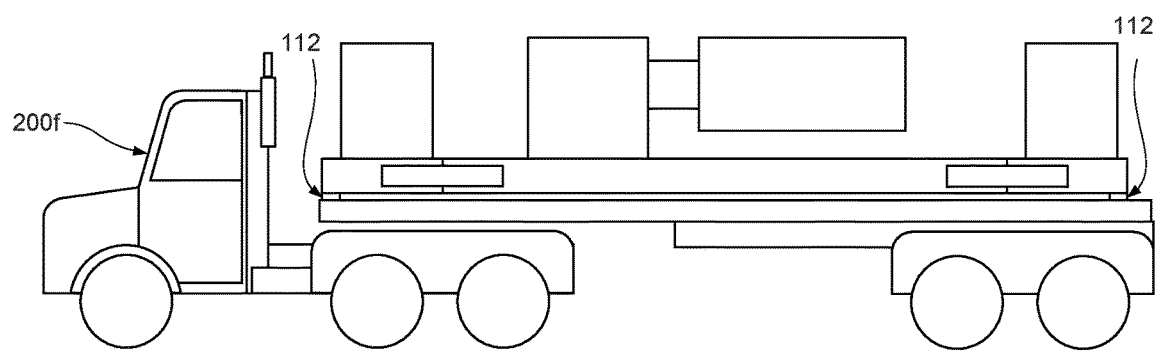
FIG. 2f shows a radar system mounted on a vehicle in an embodiment.

FIG. 2f shows a radar system mounted on a vehicle in an embodiment.

As shown in FIG. 2f, a core module 110 coupled to a first accessory module 120 and a second accessory module as described above is transported by an articulated truck 200f similar to that shown in FIG. 2e. In this case however it may be noted that the radar system comprising a core module and a first and second accessory module is coupled to the platform of the truck by solely the coupling elements 221, 231 of the first and second accessory module respectively, the core module being supported solely by its coupling to the first and second accessory modules.

While FIG. 2 presents various configurations for transporting embodiments of the invention using a truck, the skilled person will recognise many other possible such configurations.

Furthermore, the radar system as described above may be mounted on many types of vehicle besides the civilian truck of FIG. 2, including tracked or half-tracked vehicles, railway vehicles and the like. The system may also be conveniently mounted on a trailer, and towed by a suitable vehicle as desired.

On this basis, embodiments are transportable by a wide range of prime movers (industrial and military, especially for off road transport) without dedicated adaptations on prime mover, especially prime movers of a number of different, standard lengths.

On this basis, embodiments fit within a limited vehicle footprint (length/width) for housing all radar functionality and supporting infra (power generator unit, cooling etc.).

On this basis, embodiments fit within limited height available for DODO C130 air/train transportable with, C130 and train transport functionality determining maximum available height for vehicle including radar, without separating the radar system from the vehicle.

Figure 3:
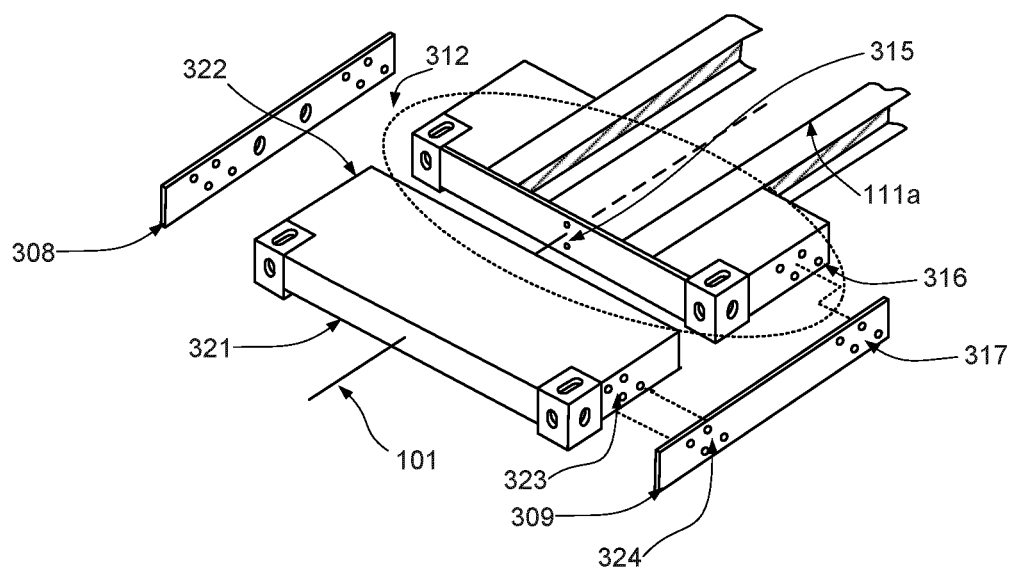
FIG. 3 shows an embodiment comprising reinforcement brackets connecting a core module and an accessory module.

FIG. 3 shows an embodiment comprising reinforcement brackets connecting a core module and an accessory module.

In addition or alternatively to a connection directly between the coupling elements of the core module 112 113 and corresponding coupling elements on an respective accessory module 122, 132 as described above, there may be provided longitudinally extending brackets 308, 309, connecting the base of the core module and an accessory module, in particular the bases thereof. As shown, the brackets 308, 309 can be coupled to the sides of the bases.

As shown, the core module is provided with a coupling element 312 comprising two ISO compatible corner fittings as described above. The coupling element 312 further comprises a series of bolt holes 316, which correspond to holes 317 in the bracket 309. Corresponding holes (not shown) may be provided on the other side of the core module, which in turn correspond to holes in the bracket 308. By means of these holes, the brackets 308, 309 may be releasably coupled to the core module. Similarly, the coupling element of the accessory module 322 further comprises a series of bolt holes 323, which correspond to holes 324 in the bracket 309. Corresponding holes (not shown) may be provided on the other side of the accessory module, which in turn correspond to holes in the bracket 308. By means of these holes, the brackets 308, 309 may be releasably coupled to the accessory module.

As shown, the coupling element 312 of the core module is further provided with a series of bolt holes 315 situated near the main axis 101, which correspond to corresponding features (not shown) of the accessory module 322. In the embodiment of FIG. 3, as indeed in variants of the embodiments described above, the ISO compatible couplings may be used solely for mounting the system on a platform. Meanwhile, coupling between the core module and the accessory module is assured by the central coupling elements 315 in combination with the brackets 308, 309.

Accordingly, a single coupling element 315 accounts for forces and movements in the lateral directions.

The brackets can be connected to the sides of the bases using any suitable fixation means, such as screws, bolts, pins, or the like. The brackets may comprise holes therein for receiving such fixation means. The fixation means may alternatively also be an integral part of the base of the core module and/or the accessory module and may protrude from the sides therefrom, wherein the fixation means can extend through the holes of the brackets and then be fixed thereto using for example nuts.

The brackets may be formed by plate-like elements. The plate-like elements may be provided with reinforcement ribs as required.

Such brackets provide the advantage of increasing the rigidity and/or stiffness of the connection, because they extend over a relatively large length of the base of the core module and/or the accessory module and are relatively stiff and/or rigid.

An advantage of mounting the brackets to the side of the of the base is that the upper surface of the frame remains free, such that modular units can easily be connected thereto and/or components accommodated in the frame remain accessible.

As shown, and as discussed above, the base of the core module and of the accessory modules may be of substantially the same width. It will be appreciated that where this is the case, it need not necessarily limit the dimension of the transducer and ancillary components, or any other elements placed on the bases. Where the core module and accessory modules are of the same width, this will inherently facilitate the use of brackets as described with reference to FIG. 3, with the support bracket being positioned on either side of said core module with respect to said major axis, positioned at the junction between said core module and said accessory module, and engaging mounting points of said core module and said accessory module so as to maintain said core module and said accessory module in a fixed spatial relationship as shown.

As described above, the coupling elements may comprise corner fittings, which may be used to secure the radar system with respect to a platform. It will be appreciated that while these corner fittings are generally situated eccentrically so as to provide maximum stability, they need not be situated at the absolute limit of the floor of the system. In particular, while the location of the corner fittings may be fixed with regard to standard freight container dimensions as discussed above, in some cases it may be desirable for the overall dimensions of the radar system to exceed the dimension of the corresponding freight container to some degree. This may be achieved by in-setting the corner fittings to some extent. In such embodiments, it may be the aggregate distance between corner fittings of the core module and any accessory module(s) coupled thereto that is substantially equal to the length of an ISO standard multimodal container e.g. as set out in table 1 above. In particular, the aggregate distance between corner fittings of the core module and any accessory module(s) coupled there to may be substantially equal to the length of a class 1C or class 1CC ISO standard multimodal container as set out in table 1 above. By this means, the complete system including one or two accessory modules may conveniently be transported by commonly available means for transporting standard freight containers, e.g. by road, rail or ship.

It will be appreciated that other respective dimensions and dispositions may be envisaged, and that the corresponding brackets will be defined accordingly.

The brackets may in particular be advantageous if the mobile radar is mounted on a vehicle or trailer using the (coupling points of one or two accessory modules, and possibly a subset or none of the coupling points of the core module, which may be the case depending on the length of the vehicle or trailer. With reference to FIG. 2e as described above for example, the combined accessory modules and core modules might be fixed to the trailer solely by the coupling points of the accessory modules. This approach may be particularly relevant for vehicles intended for standard length freight containers, where the length of the core module alone is not sufficient to situate the core module's coupling points in correspondence with those of the vehicle.

As described above, the transducer mounting be articulated, which may exert additional forces (momentum) on the core module. Because in some cases, some of the coupling elements of the core module may not be connected to respective connections of the vehicle or trailer, a stiff connection between the base of the core module and the accessory module may be desirable, such that the core element inertial forces are transferred to the vehicle or trailer via the bases of the additional element(s).

Accordingly, as described, a radar system is provided based on a core module comprising a radar transducer based on a long, flat platform, provided with coupling elements at each end, which may comprise ISO standard corner fittings as used in freight containers. Accessory modules may be connected to the core module by means of these coupling elements at each end. Accessory modules may provide power, communications, cooling or other support functions as required. The coupling achieved between the core module and accessory modules may be reinforced with side brackets, and may be sufficiently strong that the weight of the complete assembly may be supported by the core module, or by the accessory modules. The combined length of the core module and accessory modules may be selected to correspond to the length of a standard freight container, and the length of the core module alone may be selected to correspond to the flat bed of a standard medium truck.

The examples described above are given as non-limitative illustrations of embodiments of the invention. They do not in any way limit the scope of the invention which is defined by the following claims.

The invention claimed is:

1. A radar system comprising a core module incorporating a radar transducer and ancillary components thereto, said core module having a major axis, said major axis being two or more times as great as any other dimension of said core module, said core module further comprising an accessory coupling in the vicinity of each extremity of said major axis, wherein each said accessory coupling comprises a structural mounting adapted to mate with a corresponding mounting on an accessory module.

2. The radar system of claim 1, wherein said accessory coupling further comprises an electrical coupling to said radar transducer and/or said ancillary components.

3. The radar system of claim 2, wherein said longitudinal members define a base, the length of said base both being between 3.0 and 4.5 m.

4. The radar system according to claim 3, where the height of the said base is less than 50 cm.

5. The radar system of claim 1, wherein said core module comprises two longitudinal load bearing members parallel to said major axis and situated either side thereof, said radar transducer being mounted on said longitudinal members.

6. The radar system of claim 5, wherein said radar transducer is mounted with respect to said load bearing members by means of an articulated mounting permitting the free orientation of said radar transducer in at least one axis through an angle of at least 75 degrees.

7. The radar system of claim 5, wherein said radar transducer is mounted with respect to said load bearing members by means of an articulated mounting permitting the free orientation of said radar transducer between a first non-operational position, and an operation position.

8. The radar system according claim 7, where the total height of the core module is maximally 150 cm when said radar transducer is in said first non-operational position.

9. The radar system of claim 1, wherein said core module further comprises a plurality of coupling points situated at the lower corners of said base, in conformity with the ISO standard corner fitting specifications.

10. The radar system according to claim 1, said system further comprising an accessory module, comprising a structural mounting adapted to mate with said structural mounting of said core module such that the mechanical coupling thereby achieved is sufficient for the whole weight of said accessory module to be supported by said core module.

11. The radar system according to claim 10, where said accessory module comprises an accessory base, said accessory base comprising ISO standard coupling points situated at two or more of the lower corners of said base, in conformity with the ISO standard corner fitting specifications, for connecting said base to ISO standard coupling points of a platform.

12. The radar system of claim 10, wherein said accessory module contains a power generation unit, wherein said power generation unit is adapted to provide electrical power to said radar transducer and/or said ancillary components via said electrical coupling.

13. The radar system of claim 10, wherein said accessory module contains a communications unit, wherein said communications unit is adapted to provide electrical communications between said radar transducer and/or said ancillary components and a remote entity.

14. The radar system of claim 10, comprising a first said accessory module coupled at one extremity of said core module and a second said accessory module coupled at the other extremity of said core module.

15. The radar system of claim 14, wherein said core module and said first accessory module and said second accessory module together have substantially the floor dimensions of an ISO standard multimodal container.

16. The radar system of claim 1, wherein said radar transducer and/or one or more said ancillary components are modular components releasably coupled to said core module or to said accessory modules.

17. The radar system of claim 1, wherein said core module and a said accessory module are of substantially the same width, said radar system further comprising a first support bracket and a second support bracket, said first support bracket and second support bracket being positioned on either side of said core module with respect to said major axis, positioned at the junction between said core module and said accessory module, and engaging mounting points of said core module and said accessory module so as to maintain said core module and said accessory module in a fixed spatial relationship.

18. A land based vehicle or trailer comprising a radar system according to claim 1.

19. The land based vehicle or trailer according to claim 18, wherein the combined height of the vehicle or trailer and the radar system is less than 2.59 m.

20. The land based vehicle or trailer according to claim 18, wherein the combined height of the vehicle or trailer and the radar system allows for Drive-On, Drive-Off transport by airplane, train or ship.

* * * * *